United States Patent Office 2,777,863
Patented Jan. 15, 1957

2,777,863

1,5-DIHYDROXY-8-NITRO-4-AMINOANTHRA-QUINONE COMPOUNDS

Joseph B. Dickey and Edmund B. Towne, Kingsport, Tenn., assignors to Eastman Kodak Company, Rochester, N. Y., a corporation of New Jersey No Drawing. Application August 17, 1951,
Serial No. 242,429

8 Claims. (Cl. 260—380)

This invention relates to new anthraquinone compounds and their application to the art of dyeing or coloring. More particularly it relates to new anthraquinone compounds which color textile materials made of or containing a cellulose alkyl carboxylic acid ester having two to four carbon atoms in the acid groups thereof, especially cellulose acetate textile materials, blue to greenish-blue shades. The invention is also directed to a process for preparing the new anthraquinone compounds.

So far as applicants are aware, no commercially available dyestuffs having a satisfactory degree of affinity for cellulose acetate textile materials color these materials in desirable blue shades which have satisfactory fastness with respect to both light and gas. Anthraquinone dyestuffs are available which color cellulose acetate textile materials blue shades which have reasonably satisfactory fastness to light but which leave much to be desired with respect to their resistance to gas fading. Similarly, azo dyestuffs are available which color cellulose acetate textile materials blue shades which have excellent resistance to gas fading but which leave much to be desired with respect to their fastness to light.

As just indicated, the known anthraquinone dyestuffs which have satisfactory affinity for cellulose acetate textile materials and which color these materials blue shades having reasonably satisfactory fastness to light leave much to be desired with respect to their resistance to gas fading. On prolonged exposure to burnt gas fumes or to ordinary city atmosphere conditions the dyeings obtained on cellulose acetate textile materials with these dyes undergo disagreeable color changes and/or a loss of strength. Depending upon the particular dyestuff, the dyeing may change from a blue shade to a reddish-blue or even a pink color. Gas fading is also known as acid fading and the two terms, as used herein, are intended to be synonymous. Much research has been directed to the development of anthraquinone dyestuffs which dye cellulose acetate textile materials blue shades which have excellent fastness to both light and gas. However, while some progress has been made, the problem has not heretofore been solved. Efforts have been made to increase the resistance of the dyeings to gas fading by the use of inhibitors but this method is not particularly satisfactory because the application of such inhibitors is usually expensive and often inconvenient. Additionally, the effect is not permanent.

It is an object of our invention to provide new anthraquinone dyestuffs having good avnity for cellulose alkyl carboxylic acid esters, having two to four carbon atoms in the acid groups thereof, textile materials and dyeing said textile materials in level blue to greenish-blue shades which have excellent fastness to both light and gas. Another object is to provide a satisfactory process for the preparation of the new anthraquinone dyestuffs of the invention. A particular object is to provide new anthraquinone dyestuffs which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

We have discovered that the new anthraquinone compounds having the probable general formula:

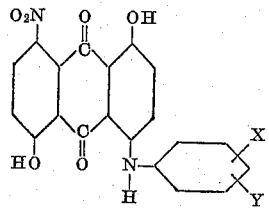

wherein X represents a monohydroxyalkyl group having one to three, inclusive, carbon atoms, a dihydroxyalkyl group having two to three, inclusive, carbon atoms or a —($OCH_2CH_2$)$_n$—O—R group wherein $n$ represents 1, 2, 3 or 4 and R represents a hydrogen atom or an alkyl group having one to two carbon atoms and Y represents a hydrogen atom, a chlorine atom, a hydroxy group, a methoxy group or a methyl group are valuable dyes for coloring textile materials made of or containing a cellulose alkyl carboxylic acid ester having two to four carbon atoms in the acid groups thereof. These dye compounds when applied to the aforesaid materials give blue to greenish-blue dyeings which have outstanding light and gas fastness properties. They are particularly of use for the coloration of cellulose acetate textile materials.

The remarkable resistance of the dyestuffs of the present invention to gas fading is shown by the fact that the dyeings obtained therewith on cellulose acetate textile materials undergo very little alteration in strength or shade even after exposure to as many as 6 AATCC gas-cycles. By contrast, various aminoanthraquinones such as 1,4-dimethylaminoanthraquinone, 1-methylamino-4-methoxyethylaminoanthraquinone, 1-methylamino-4-β-hydroxyethylaminoanthraquinone, 1,4-diaminoanthraquinone, 1,4,5,8-tetraaminoanthraquinone, 1,4-di-β-hydroxyethylamino-5,8-dihydroxyanthraquinone and 1-amino-4-methylaminoanthraquinone-2 carboxylic amide, which are used extensively to color cellulose acetate textile materials, are markedly changed after only 1 AATCC gas-cycle.

Similarly the outstanding light-fastness of our new dyestuffs is apparent from the fact that the dyeings obtained therewith on cellulose acetate textile materials show little fading after 40 to 60 hours exposure on the Fade-O-Meter light-fastness apparatus. The significance of this will be apparent from the fact that dyeings on cellulose acetate which show little fading after 20 hours exposure on the Fade-O-Meter light-fastness apparatus are considered good.

We are aware that U. S. Patent 2,480,269 discloses anthraquinone dyestuffs obtained by reacting polyhydroxy polynitroanthraquinone compounds such as, for example, 4,8-dinitro-anthrarufin, 4,5-dinitro-chrysazin or 4,8-dinitro-anthrachrysone, with a primary aromatic amine such as aniline, toluidine, amino-ethylbenzene, amino-acetophenone or amino-phenol, for example. However, this patent does not disclose the dyestuffs of the present application and further the dyestuffs of the present application are superior to the dyestuffs of said patent. One, the dyestuffs of the present application have better affinity for cellulose acetate textile materials and two, in general, they give more light-fast dyeings on cellulose acetate textile materials than do the dyestuffs of U. S. Patent 2,480,269.

The new anthraquinone compounds of the invention are prepared by condensing 1,5-dihydroxy-4,8-dinitroanthraquinone with a primary arylamine having the formula:

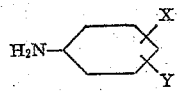

wherein X and Y have the meaning previously assigned to them. The reaction can be carried out using an excess of the amine, usually 5 to 10 parts by weight of the amine to 1 part of 4,8-dinitro-1,5-dihydroxyanthraquinone, with or without a small amount of water being present. Also, the reaction can be carried out in the presence of an organic solvent or diluent which does not undergo reaction with the reactants. When an organic diluent or solvent is present, smaller amounts of the amine are required than when no organic diluent or solvent is employed. Although water or an organic solvent or diluent need not be present, their use is preferred. Organic solvents or diluents that can be employed include, for example, nitrobenzene, o-nitrotoluene, quinoline, quinaldine, ethyl alcohol, butyl alcohol, amyl alcohol, pyridine, 2-methyl-5-ethylpyridine, a phenol such as phenol or m-cresol, an N,N-di-(low carbon alkyl) amide of a normal fatty acid having one to three carbon atoms such as, for example, N,N-dimethyl formamide, N,N-diethyl formamide, N,N-diisopropyl formamide, N,N-dimethyl acetamide, N,N-diethyl acetamide, N,N-dipropyl acetamide and N,N-dimethyl propionamide, a glycol such as, for example, ethylene glycol, propylene glycol (propandiol-1,2), trimethylene glycol (propandiol-1,3), alpha butylene glycol (butandiol-1,2), butandiol-1,3, diethylene glycol and an ether glycol such as, for example, ethyleneglycol monomethyl ether (methyl Cellosolve), ethyleneglycol monoethyl ether (Cellosolve), ethyleneglycol monobutyl ether (butyl Cellosolve), diethyleneglycol monobutyl ether (butyl Carbitol), diethylene glycol monoethyl ether (Carbitol) and diethylene glycol monomethyl ether (methyl Carbitol).

Other than selecting a temperature high enough to effect the desired reaction and not so high as to cause the formation of an appreciable amount of undesirable by-products, the exact temperature employed does not appear to be critical. Thus, temperatures ranging from about 25° C. to about 200° C. can be used although we prefer to use temperatures from about 120° C. to 160° C. Ordinarily temperatures lower than about 100° C. are not used as too long a reaction time is required when such temperatures are employed.

Typical of the primary arylamines used in the preparation of the anthraquinone compounds of the invention are: o-aminobenzyl alcohol, m-aminobenzyl alcohol, p-aminobenzyl alcohol, o-aminophenylethyl alcohol, m-aminophenylethyl alcohol, p-aminophenylethyl alcohol, o-aminophenylmethylcarbinol, p-aminophenylmethylcarbinol, o-(CHOHCH$_2$CH$_2$OH)aniline, p-(CHOHCH$_2$CH$_2$OH)-aniline, o-(CHOHCH$_2$OH)aniline, m-(CHOHCH$_2$OH)aniline, p-(CHOHCH$_2$OH)aniline, o-(β-hydroxyethoxy)aniline, p-(β-hydroxyethoxy)aniline, o-(β-hydroxyethoxyethoxy)aniline, p-(β-hydroxyethoxyethoxy)aniline, o-(β-hydroxyethoxyethoxyethoxy)aniline, p-(β-hydroxyethoxyethoxyethoxy)aniline, o-(β-methoxyethoxy)aniline, p-(β-ethoxyethoxy)aniline, p-(β-ethoxyethoxyethoxy)aniline, o-(β-methoxyethoxyethoxy)aniline, p-(β-methoxyethoxyethoxy)aniline, p-(β-ethoxyethoxyethoxyethoxy)aniline, o-(CH$_2$CH$_2$CH$_2$OH)aniline, p-(CH$_2$CH$_2$CH$_2$OH)aniline
2-methoxy-5-(CH$_2$CH$_2$CH$_2$OH)-aniline
2-hydroxy-5-(CH$_2$CH$_2$CH$_2$OH)-aniline
2-chloro-5-(CH$_2$CH$_2$CH$_2$OH)-aniline
2-methyl-5-(CH$_2$CH$_2$CH$_2$OH)-aniline
2-methoxy-5-(CH$_2$CH$_2$OH)aniline
2-chloro-5-(CH$_2$CH$_2$OH)-aniline 3-chloro-4-aminobenzyl alcohol, 3-amino-4-methoxybenzyl alcohol, 2-methoxy-5-(CHOHCH$_3$)-aniline, 2-methyl-5-(CHOHCH$_3$)-aniline, 2-methyl-3-(CH$_2$CH$_2$OH)-aniline, 2-hydroxy-5-(CH$_2$CH$_2$OH)-aniline and m-(β-hydroxyethoxyethoxyethoxy)aniline.

The following examples illustrate the anthraquinone compounds of our invention and the manner in which they are prepared.

Example 1

3.28 grams of 1,5-dihydroxy-4,8-dinitroanthraquinone, 25 ccs. of n-amyl alcohol and 4.1 grams of o-aminophenylethyl alcohol are heated together under reflux for seven hours. The resulting blue solution is filtered at the boil and the filtrate is cooled in an ice bath. The crystals that separate are recovered by filtration and dried and the mother liquor is concentrated to give one or more groups of crystals as desired. The dye compound thus obtained has the formula:

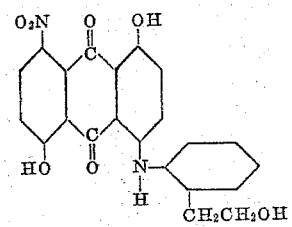

It colors cellulose acetate textile materials blue shades.

Example 2

2 grams of 1,5-dihydroxy-4,8-dinitroanthraquinone, 0.3 ccs. of water and 12.3 grams of p-aminophenylethyl alcohol are heated together under reflux at 120° C. for 4 hours. The reaction mixture thus obtained is added to 50 ccs. of ethyl alcohol and the resulting reaction mixture is poured into 200 ccs. of cold 10% aqueous hydrochloric acid. The dye compound which precipitates is recovered by filtration, washed neutral with cold water and purified if desired by crystallization from n-amyl alcohol. It colors cellulose acetate blue shades.

Example 3

2 grams of 1,5-dihydroxy-4,8-dinitroanthraquinone, 0.4 ccs. of water and 15 grams of p-(β-hydroxyethoxyethoxy)-aniline are heated together at 125° C.–130° C. for 4 hours under reflux. The hot reaction mixture is then diluted with 60 ccs. of ethanol and refluxed into 60 ccs. of 10% aqueous hydrochloric acid, with stirring, and allowed to cool. The dye compound which precipitates is recovered by filtration, washed neutral with water and dried. 1.8 grams of dye is obtained as a dark blue powder. It colors cellulose acetate textile materials blue shades and has the formula:

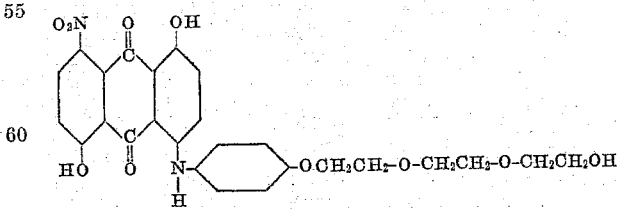

Example 4

By the use of 15 grams of o-(β-hydroxyethoxyethoxy)-aniline in place of p - (β-hydroxyethoxyethoxyethoxy)-aniline in Example 3 a dye compound is obtained which likewise colors cellulose acetate textile materials blue shades.

Example 5

2 grams of 1,5-dihydroxy-4,8-dinitroanthraquinone, 2 grams of p-(CH$_2$CH$_2$CH$_2$OH)aniline and 15 ccs. of ethyleneglycol monoethyl ether are refluxed together for 6 hours. The reaction mixture is then poured into 100 ccs. of 8.5% aqueous hydrochloric acid and the dye compound which precipitates is recovered by filtration, washed with hot water until neutral and dried. 1.85 grams of dye is thus obtained. The dye colors cellulose acetate textile materials blue shades. If desired, the dye can be further purified by crystallization from n-amyl alcohol.

*Example 6*

2 grams of 1,5-dihydroxy-4,8-dinitroanthraquinone, 0.30 ccs. of water and 12.3 grams of m-aminophenylmethyl alcohol are heated together under reflux at 142° C. for 4 hours. The reaction mixture thus obtained is dissolved in 60 ccs. of ethyl alcohol or isopropyl alcohol and poured into 70 ccs. of 10% aqueous hydrochloric acid, with stirring. The dye compound which precipitates is recovered by filtration, washed with water until neutral and then slurried with 100 ccs. of hot water and again recovered by filtration and dried. 1.7 grams of dye is thus obtained. If desired, it may be further purified by crystallization from n-amyl alcohol. It colors cellulose acetate textile materials blue shades.

*Example 7*

1.1 grams of 1,5-dihydroxy-4,8-dinitroanthraquinone, 1.4 grams of p-aminophenylethyl alcohol and 20 ccs. of nitrobenzene are heated together for 6 hours at 175° C. The nitrobenzene is removed from the reaction mixture by steam distillation and the dye compound which precipitates is recovered by filtration, washed well with water, dried and then further purified by crystallization from n-amyl alcohol. The dye compound thus obtained colors cellulose acetate textile materials blue shades.

*Example 8*

1.1 grams of 1,5-dihydroxy-4,8-dinitroanthraquinone, 1.4 grams of o-aminophenylethyl alcohol and 20 ccs. of ethyleneglycol monoethyl ether are refluxed together at 135° C. for 5 hours. The blue solution resulting is poured into 200 ccs. of cold 10% aqueous hydrochloric acid and the dye compound which precipitates is recovered by filtration and purified by crystallization from n-amyl alcohol. The dye compound obtained colors cellulose acetate textile materials blue shades.

The compound of this example can be also prepared by using 20 ccs. of ethyleneglycol monomethyl ether and a reaction temperature of 124° C. in place of the ethyleneglycol monoethyl ether of the example. Similarly, the reaction can be carried out using 20 ccs. of quinoline and heating at 150° C. for 4 hours.

*Example 9*

3.28 grams of 1,5-dihydroxy-4,8-dinitroanthraquinone, 50 ccs. of quinoline and 5 grams of m-aminophenylmethylcarbinol

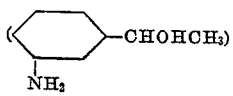

are heated together for 5 hours at 130° C. The blue solution resulting is poured into 200 ccs. of cold 10% aqueous hydrochloric acid and the dye compound which precipitates is recovered by filtration and washed free of acid with water. It colors cellulose acetate textile materials blue shades.

*Example 10*

3.28 grams of 1,5-dihydroxy-4,8-dinitroanthraquinone and 18 grams of m-aminobenzyl alcohol are heated together in a flask at 130° C.–140° C. for 6 hours. The reaction mixture is then poured into 200 ccs. of cold 10% aqueous hydrochloric acid and the dye compound which precipitates is recovered by filtration, washed well with water and dried. The dye compound thus obtained colors cellulose acetate textile materials blue shades.

*Example 11*

3.28 grams of 1,5-dihydroxy-4,8-dinitroanthraquinone, 50 ccs. of quinoline and 5 grams of p-(CHOHCH₂OH) aniline

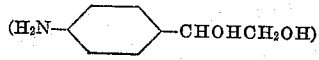

are heated together at 130° C. for 5 hours. The reaction mixture is then poured into 200 ccs. of cold 10% aqueous hydrochloric acid and the dye compound which precipitates is recovered by filtration and washed free of acid with water. The dye compound thus obtained colors cellulose acetate textile materials blue shades.

*Example 12*

By the use of an equivalent amount of 2-methyl-3-(CH₂CH₂OH)-aniline

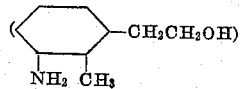

in place of p-aminophenylethyl alcohol in Example 2 a dye compound is obtained which similarly colors cellulose acetate textile materials blue shades.

*Example 13*

By the use of an equivalent amount of 2-hydroxy-5-(CH₂CH₂OH)-aniline

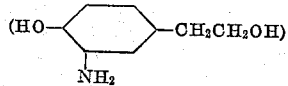

in place of p-aminophenylethyl alcohol in Example 2 a dye compound is obtained which colors cellulose acetate textile materials blue-green shades.

*Example 14*

By the use of an equivalent amount of 4-chloro-aminophenylethyl alcohol in place of p-aminophenylethyl alcohol in Example 2 a dye compound which colors cellulose acetate textile materials blue shades is obtained.

*Example 15*

By the use of an equivalent amount of 3-amino-2-methylphenylmethylcarbinol

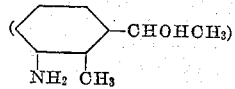

in place of p-aminophenylethyl alcohol in Example 2 a dye compound is obtained that colors cellulose acetate textile materials blue shades.

*Example 16*

By the use of an equivalent amount of 3-amino-4-methoxyphenylmethylcarbinol in place of p-aminophenylethyl alcohol in Example 2 a dye compound is obtained which colors cellulose acetate textile materials blue shades.

*Example 17*

2 grams of 1,5-dihydroxy-4,8-dinitroanthraquinone, 3 grams of o-(β-hydroxyethoxyethoxyethoxyethoxy)aniline

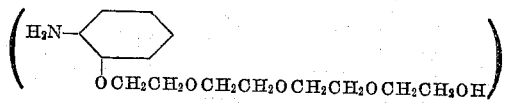

and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

By the use of 3 grams of p-(β-hydroxyethoxyethoxyethoxyethoxy)aniline in place of o-(β-hydroxyethoxy-ethoxyethoxyethoxy)aniline in the above example a dye compound is obtained which similarly colors cellulose acetate textile materials blue shades.

*Example 18*

2 grams of 1,5-dihydroxy-4,8-dinitroanthraquinone, 0.4 ccs. of water and 15 grams of p-(β-ethoxyethoxyethoxy)aniline are reacted together and the dye compound formed is recovered in accordance with the procedure described in Example 3. 1.4 grams of a dye compound which colors cellulose acetate textile materials blue shades is obtained.

*Example 19*

2 grams of 1,5-dihydroxy-4,8-dinitroanthraquinone, 3 grams of o-(β-methoxyethoxyethoxy)aniline and 15 ccs. of n-amyl alcohol are refluxed together for 6 hours. The reaction mixture is then cooled and poured into 100 ccs. of cold 10% aqueous hydrochloric acid, with stirring. The dye compound which precipitates is recovered by filtration, washed until neutral with water and dried. It colors cellulose acetate textile materials blue shades. A yield of 1.5 grams is obtained.

*Example 20*

2 grams of 1,5-dihydroxy-4,8-dinitroanthraquinone, 3 grams of p-(β-hydroxyethoxyethoxy)aniline and 20 ccs. of quinoline are heated together at 150° C. for 4 hours. The reaction mixture is then cooled and poured into 100 ccs. of cold 10% aqueous hydrochloric acid. The dye compound which precipitates is recovered by filtration, washed with water until neutral and dried. The dye compound is obtained as a dark blue powder and colors cellulose acetate textile materials blue shades.

*Example 21*

2 grams of 1,5-dihydroxy-4,8-dinitroanthraquinone, 3 grams of p-(hydroxyethoxy)aniline and 15 ccs. of ethyleneglycol monomethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

*Example 22*

2 grams of 1,5-dihydroxy-4,8-dinitroanthraquinone, 0.4 ccs. of water and 13 grams of a mixture of o-($CH_2CH_2CH_2OH$)aniline and p-($CH_2CH_2CH_2OH$)aniline are heated together under refluxing conditions at 140° C. for 4 hours. Then the hot reaction mixture is diluted with 60 ccs. of ethyl alcohol, refluxed and filtered while hot. The filtrate is poured into 60 ccs. of cold 10% aqueous hydrochloric acid, with stirring, and allowed to cool. The dye compound formed is recovered by filtration, washed with hot water and dried. 1.9 grams of a dye mixture which colors cellulose acetate textile materials blue shades is thus obtained.

The mixture o- and p-($CH_2CH_2CH_2OH$)aniline used in the above reaction has a boiling point of 175° C–180° C./6 mm. and was prepared by nitrating the acetate of

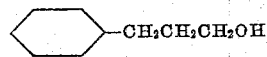

hydrolyzing the acetate and reducing the mixture of o- and p-($CH_2CH_2CH_2OH$)nitrobenzene with hydrogen in the presence of Raney nickel catalyst.

*Example 23*

2 grams of 1,5-dihydroxy-4,8-dinitroanthraquinone, 2 grams of o-($CH_2CH_2CH_2OH$)aniline and 15 ccs. of ethylene-glycol monomethyl ether are reacted together in accordance with the procedure described in Example 5. 1.8 grams of a dye which colors cellulose acetate textile materials blue shades is obtained.

*Example 24*

By the use of 13 grams of m-($CH_2CH_2CH_2OH$)aniline in place of the mixture of o- and p-($CH_2CH_2CH_2OH$)-anilines used in Example 22, 2 grams of a dye which colors cellulose acetate textile materials greenish-blue shades is obtained.

The m-($CH_2CH_2CH_2OH$)aniline used above was prepared by converting m-nitrobenzaldehyde to m-nitrocinnamic acid by heating with sodium acetate and acetic anhydride. The m-nitrocinnamic acid in turn was reduced by hydrogen in the presence of Raney nickel catalyst to m-aminophenylpropionic acid which in turn was reduced with lithium aluminum hydride to

*Example 25*

2 grams of 1,5-dihydroxy-4,8-dinitroanthraquinone and 13 grams of a mixture of o- and p-($CH_2CHOHCH_3$)aniline (boiling point 145° C.–150° C./4.5 mm.) are reacted together in accordance with the procedure described in Example 22 except that no water is used in the reaction. 1.9 grams of a dye mixture which colors cellulose acetate textile materials blue shades is obtained.

The mixture of o- and p-($CH_2CHOHCH_3$)aniline used above is prepared by reducing phenylacetone, acetylating the resulting carbinol, nitrating the carbinol, deacetylating and then reducing the nitrated carbinol.

*Example 26*

2 grams of 1,5-dihydroxy-4,8-dinitroanthraquinone, 1.2 grams of a mixture of o- and

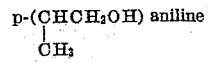

and 15 ccs. of nitrobenzene are reacted together at 155° C. for 5 hours. The reaction mixture is steam distilled to remove the nitrobenzene and the residue remaining is digested with warm 10% aqueous hydrochloric acid and allowed to cool. The dye compound which precipitates is recovered by filtration, washed with water and dried. 1.75 grams of a dye mixture which colors cellulose acetate textile materials blue shades is obtained.

The mixture of amines used in the above reaction was prepared by reacting styrene with carbon monoxide and hydrogen in an oxo reactor and acetylating the

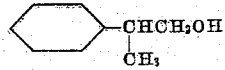

thus formed. This compound was then nitrated, reduced and the amino ester mixture resulting was hydrolyzed to remove the acetate grouping. The product thus obtained has a boiling point of 150° C.–154° C./4 mm.

*Example 27*

2 grams of 1,5-dihydroxy-4,8-dinitroanthraquinone, 0.4 cc. of water and 13 grams of

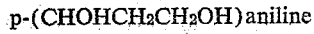

are reacted together in accordance with the procedure described in Example 22. The dye compound thus obtained colors cellulose acetate textile materials deep blue-green shades.

The amine used in the above example was prepared as a viscous oil by nitrating the diacetate of 3-(phenyl)-1,3-propanediol with fuming nitric acid and acetic anhydride at 20° C–30° C. The p-nitro ester reaction product separates as a solid when the nitration mixture is poured into ice water and is extracted with ethyl ether. Then the p-nitro ester compound is reduced with hydrogen in the presence of Raney nickel catalyst, and then upon hydrolysis of the ester compound the desired amine compound is obtained. The o-nitro ester isomer is obtained from the ether solution and is then similarly reduced and hydrolyzed to obtain o-(CHOHCH₂CH₂OH)aniline

Example 28

2 grams of 1,5-dihydroxy-4,8-dinitroanthraquinone, 2 grams of a mixture of o- and p-(CHOHCH₂CH₂OH)aniline and 15 ccs. of N,N-dimethyl formamide are reacted together at 140° C. for 5 hours. Upon working up the reaction mixture in accordance with the procedure described in Example 5 a dye mixture is obtained which colors cellulose acetate greenish-blue shades.

Example 29

2 grams of 1,5-dihydroxy-4,8-dinitroanthraquinone, 2 grams of 2-methoxy-5-(CH₂CH₂CH₂OH)-aniline (melting point 66° C.–67° C.) and 20 ccs. of n-amyl alcohol were refluxed together for 6 hours. Upon working up the reaction mixture in accordance with the procedure described in Example 5 a dye compound is obtained which colors cellulose acetate textile materials blue shades.

The amine used in the above reaction was prepared by nitrating p-methoxybenzaldehyde and converting the compound thus obtained to

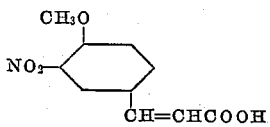

by means of the Perkin's reaction, the unsaturated acid compound thus obtained was then reduced with hydrogen in the presence of Raney nickel catalyst to the saturated acid which in turn was reduced with lithium aluminum hydride to give the desired amine compound.

Example 30

2 grams of 1,5-dihydroxy-4,8-dinitroanthraquinone, 2 grams of a mixture of o- and p-(CH₂CHOHCH₂OH)aniline and 20 ccs. of quinoline are reacted together at 150° C. for 5 hours. The reaction mixture is then poured into 150 ccs. of 8.5% aqueous hydrochloric acid and the dye compound which precipitates is recovered by filtration, washed with hot water until neutral and dried. The dye compound thus obtained colors cellulose acetate textile materials blue shades.

The mixture of o- and p-(CH₂CHOHCH₂OH)aniline used in the above example was prepared by reacting phenylmagnesium bromide with

and acetylating the resulting

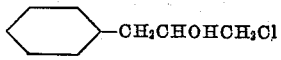

first with potassium acetate in acetic acid and then with acetic anhydride. The resulting diacetate of 1-phenyl-2,3-propanediol was then nitrated and hydrolyzed to remove both acetate groupings and then treated with hydrogen in the presence of Raney nickel catalyst to reduce the nitro group to an amino group.

Example 31

2 grams of 1,5-dihydroxy-4,8-dinitroanthraquinone, 2 grams of a mixture of o- and p-(CHOHCH₂CH₃)aniline and 20 ccs. of N,N-dimethylacetamide are reacted together at 135° C. for 6 hours. Upon working up the reaction mixture in accordance with Example 5 a dye-compound is obtained which colors cellulose acetate textile materials blue shades The mixture of o- and p-(CHOHCH₂CH₃)aniline used in the above example was prepared by catalytically reducing propiophenone, acetylating the resulting carbinol, nitrating, reducing the nitro group to an amino group and hydrolyzing the acetate with aqueous sodium hydroxide.

Example 32

2 grams of 1,5-dihydroxy-4,8-dinitroanthraquinone, 2 grams of m-(CHOHCH₂CH₃)aniline and 20 ccs. of dioxane are reacted together in an autoclave at 140° C. for 4 hours. Upon working up the reaction mixture in accordance with Example 5 a dye compound is obtained which colors cellulose acetate textile materials blue shades.

The m-(CHOHCH₂CH₃)aniline was prepared by nitrating propiophenone and catalytically reducing the nitro and keto groups.

Example 33

2 grams of 1,5-dihydroxy-4,8-dinitroanthraquinone, 2 grams of

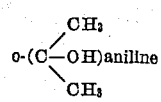

a viscous oil, and 20 ccs. of ethyleneglycol are reacted together at 155° C. for 6 hours. Upon working up the reaction mixture in accordance with the procedure described in Example 5 a dye compound is obtained which colors cellulose acetate textile materials blue shades.

The amine used in the above example was prepared according to J. Chem. So., p. 808 (1947).

Example 34

2 grams of 1,5-dihydroxy-4,8-dinitroanthraquinone, 2.3 grams of 3-(2-and/or 4-amino-3-chlorophenyl)-1-propanol and 15 ccs. of dimethylaniline are reacted together at 150° C. for 5 hours. Upon working up the reaction mixture in accordance with the procedure described in Example 5 a dye compound is obtained which colors cellulose acetate textile materials blue shades.

The amine used in the above reaction was prepared from m-(CH₂CH₂CH₂OH)aniline by replacing the amino group with chlorine (diazo reaction), acetylating, nitrating, reducing the nitro group to an amino group by means of hydrogen in the presence of Raney nickel catalyst and then hydrolyzing the ester with alcoholic HCl.

Example 35

2 grams of 1,5-dihydroxy-4,8-dinitroanthraquinone, 2 grams of a mixture of o- and p-(CHOHCHOHCH₃)aniline and 15 ccs. of ethyleneglycol monoethyl ether are reacted together in accordance with the procedure described in Example 5. The dye compound obtained colors cellulose acetate textile materials blue shades.

The mixture of amines used in the above reaction was prepared by nitration, reduction and hydrolysis of the acetate of

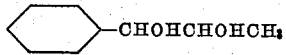

The preparation of this latter compound is described in Ber., vol. 17, page 709.

Example 36

2 grams of 1,5-dihydroxy-4,8-dinitroanthraquinone, 2 grams of a mixture of

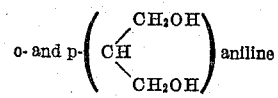

and 15 ccs. of ethyleneglycol monoethyl ether are reacted together in accordance with the procedure described in Example 5. The dye compound obtained colors cellulose acetate textile materials blue shades.

The mixture of amines used in the above example was prepared by nitrating, reducing and hydrolyzing the acetate of

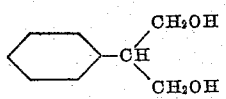

This latter compound was prepared according to J. A. C. S., vol. 70, page 3121 (1948).

Example 37

3.28 grams of 1,5-dihydroxy-4,8-dinitroanthraquinone, 4.5 grams of a mixture of o-, m- and p-aminobenzyl alcohol and 50 ccs. of quinoline are heated together at 150° C. for 5 hours. Upon working up the reaction mixture in accordance with the procedure described in Example 9 a dye product is obtained which colors cellulose acetate textile materials blue shades.

The mixture of o-, m- and p-aminobenzyl alcohol used in the above example is prepared by nitrating benzaldehyde and reducing the mixture of nitrobenzaldehyde compounds with hydrogen in the presence of Raney nickel catalyst.

Example 38

3.28 grams of 1,5-dihydroxy-4,8-dinitroanthraquinone, 4.5 grams of a mixture of o- and p-aminophenylethyl alcohol and 25 ccs. of diethylene glycol monoethyl ether are heated together at 160° C. for 6 hours. Upon working up the reaction mixture in accordance with the procedure described in Example 1 a dye product is obtained which colors cellulose acetate textile materials blue shades.

The mixture of o- and p-aminophenylethyl alcohol used in the above example is prepared by nitrating phenylethyl acetate, removing the acetate group by hydrolysis and reducing the mixture of o- and p-nitrophenylethyl alcohol with hydrogen in the presence of Raney nickel catalyst.

Example 39

3.28 grams of 4,8-dinitro-1,5-dihydroxyanthraquinone, 5 grams of m-(β-hydroxyethoxyethoxyethoxy) aniline and 25 ccs. of diethylene glycol monoethyl ether are refluxed together for 6 hours. The reaction mixture is then cooled and poured into 100 ccs. of cold 10% aqueous hydrochloric acid, with stirring. The dye compound which precipitates is recovered by filtration, washed with water until neutral and dried. It colors cellulose acetate textile materials blue shades.

By the use of an equivalent amount of m-(β-hydroxyethoxyethoxy)aniline and m-(β-ethoxyethoxyethoxy)aniline, respectively, in place of m-(β-hydroxyethoxyethoxyethoxy)aniline in the above example dye compounds are obtained which color cellulose acetate textile materials blue shades.

Compounds having the formula:

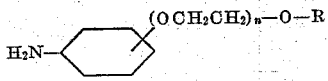

wherein n and R have the meaning previously assigned to them are prepared in accordance with the general procedure described in U. S. Patent 2,391,011.

The amine used in Example 14 (2-and/or 3-amino-4-chlorophenylethyl alcohol is prepared by treating diazotized p-aminophenylethyl alcohol with CuCl in the usual manner to obtain p-chlorophenylethyl alcohol which is nitrated and then reduced with hydrogen in the presence of Raney nickel catalyst.

The p-($CH_2CH_2CH_2OH$)aniline (M. P. 62° C.) used in Example 5 was obtained as crystals from the mixture of o- and p-($CH_2CH_2CH_2OH$)aniline of Example 22 upon long standing.

m-Aminophenylethyl alcohol is prepared as follows: m-nitrophenylacetic acid is reduced at 50° C.–55° C. to m-aminophenylacetic acid in ethyl alcohol over Raney nickel. Ethyl alcohol is removed in vacuo from the reaction mixture and the residue consisting essentially of m-aminophenylacetic acid is placed in a Soxhlet apparatus and reduced to m-aminophenylethyl alcohol in the presence of a boiling ethyl ether solution of a large excess of lithium aluminum hydride. Upon working up the reaction mixture m-aminophenylethyl alcohol boiling at 135° C.–138° C./2 mm. is obtained.

As indicated hereinbefore the dye compounds of the invention can be purified, if desired, by crystallization from n-amyl alcohol.

The use of a solvent or diluent having the formula:

$$HOCH_2CH_2OQ$$

wherein Q represents an alkyl group having 1 to 4, inclusive, carbon atoms, a β-hydroxyethyl group or a —$CH_2CH_2OZ$ group, wherein Z represents an alkyl group having 1 to 4, inclusive, carbon atoms is described and claimed in copending Johnson and Wankel U. S. application Serial No. 242,441, now abandoned, filed the same date as the present invention.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70°–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat, depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the general formula:

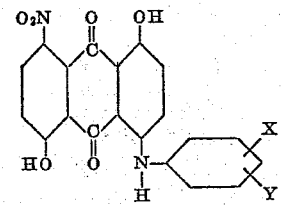

wherein X represents a member selected from the group consisting of a monohydroxyalkyl group having one to three, inclusive, carbon atoms and a dihydroxyalkyl group having two or three, inclusive, carbon atoms and Y represents a member selected from the group consisting of a hydrogen atom, a chlorine atom, a hydroxy group, a methoxy group and a methyl group.

2. The anthraquinone compounds having the general formula:

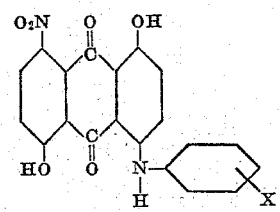

wherein X represents a monohydroxyalkyl group having one to three, inclusive, carbon atoms.

3. The anthraquinone compounds having the general formula:

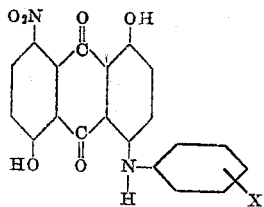

wherein X represents a dihydroxyalkyl group having two to three, inclusive, carbon atoms.

4. The anthraquinone compound having the formula:

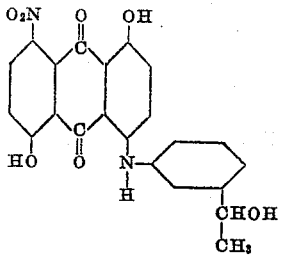

5. The anthraquinone compound having the formula:

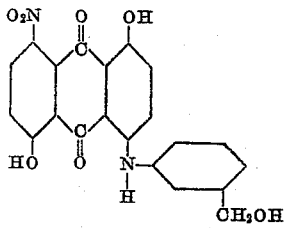

6. The anthraquinone compound having the formula:

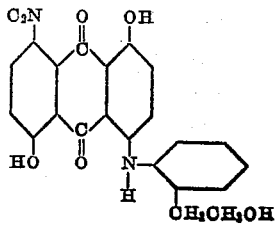

7. The anthraquinone compound having the formula:

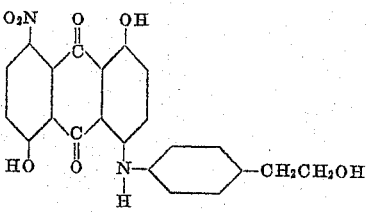

8. The anthraquinone compound having the formula:

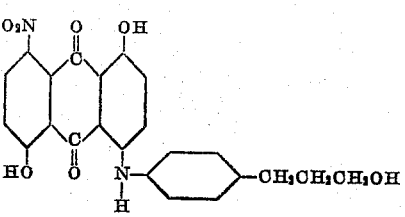

References Cited in the file of this patent

UNITED STATES PATENTS

| | | |
|---|---|---|
| 2,053,273 | Ellis et al. | Sept. 8, 1936 |
| 2,242,760 | Schoeller et al. | May 20, 1941 |
| 2,333,384 | Klein | Nov. 2, 1943 |
| 2,341,891 | Wuertz et al. | Feb. 15, 1944 |
| 2,391,011 | Dickey et al. | Dec. 18, 1945 |
| 2,466,008 | Dickey | Apr. 5, 1949 |
| 2,480,269 | Seymour et al. | Aug. 30, 1949 |
| 2,487,045 | Dickey et al. | Nov. 8, 1949 |
| 2,641,602 | Straley et al. | June 9, 1953 |
| 2,651,641 | Straley et al. | Sept. 8, 1953 |
| 2,713,060 | Salvin | July 12, 1955 |

FOREIGN PATENTS

| | | |
|---|---|---|
| 492,697 | Great Britain | Sept. 26, 1938 |